United States Patent [19]
Fitch et al.

[11] 3,862,908

[45] Jan. 28, 1975

[54] MICROSPHERES OF URANIA AND OTHER MATERIALS

[75] Inventors: Frederick T. Fitch, Shaker Heights, Ohio; Ann B. Braun, Rockville, Md.

[73] Assignee: W. R. Grace & Co., New York, N.Y.

[22] Filed: May 3, 1967

[21] Appl. No.: 635,662

Related U.S. Application Data

[63] Continuation-in-part of Ser. No. 192,088, May 3, 1962, abandoned, and a continuation-in-part of Ser. No. 305,828, Aug. 20, 1963, abandoned.

[52] U.S. Cl. ............ 252/301.1 S, 106/39, 106/55, 106/57, 423/11, 423/42, 423/50, 423/55, 423/65, 423/85, 423/122, 423/158, 423/252, 423/253, 423/260, 423/261
[51] Int. Cl. ........................................... C01q 56/00
[58] Field of Search ............ 252/301.1, 302; 264/.5, 264/15; 23/345–355, 316, 343, 344, 316, 140, 145, 144, 141, 182, 146, 147, 183, 184, 186, 200, 201, 202; 176/89; 106/39, 55, 57.58

[56] References Cited
UNITED STATES PATENTS

| | | | |
|---|---|---|---|
| 3,105,052 | 9/1963 | Haws, Jr. | 252/301.1 |
| 3,168,479 | 2/1965 | St. Pierre | 252/301.1 |
| 3,278,655 | 10/1966 | Barr | 252/301.1 X |

OTHER PUBLICATIONS

A.E.C. Report BMI-1117, 1956, "Effect of Ceramic or Metal Additives In High–$UO_2$ Bodies," Bowers et al., pages 5, 8, 9, 12 and 13.

*Primary Examiner*—Benjamin R. Padgett
*Assistant Examiner*—Melvin J. Scolnick
*Attorney, Agent, or Firm*—Joseph P. Nigon

[57] ABSTRACT

As compositions of matter non-agglomerating microspheres of oxides in the 5 to 500 micron size range. The particles have a uniform crystallite structure with a grain size of 1 micron or less, and a sigma value derived from the equation Sigma = $D/D_x$ of about 1 to 1.3.

10 Claims, No Drawings

MICROSPHERES OF URANIA AND OTHER MATERIALS

This application is a continuation-in-part of application Ser. No. 192,088, filed May 3, 1962 and now abandoned of Frederick T. Fitch and Ann E. Baker, now by marriage, Ann B. Braun and application Ser. No. 305,828 of Frederick T. Fitch and Ann B. Braun filed Aug. 20, 1963 and now abandoned.

This invention relates to spherical particles of controlled size formed of colloidal residues by drying aquasols. In one particular embodiment, it relates to preparing dense spheres of nuclear materials such as urania, other actinide oxides, zirconium oxide, systems containing actinide oxides, actinide oxide solid solutions, and to these particles as compositions of matter.

In recent years, oxides of the actinide metals have become of paramount importance in the field of nuclear fuel development. These oxides may be used in the form of pellets or may be in the form of irregular granules which can be packed to high density by swaging or vibratory techniques. The fabrication of these fuels in dense form from ceramic powders requires pelleting or compaction, followed by prolonged sintering at very high temperatures.

The disadvantages inherent in ceramic fuel elements have been overcome with the recent development of coated microspheres. The microspheres are now of considerable importance and several reactor designs are based on the use of microspheres in production of the fuel elements. Such microspheres consist of dense actinide oxide spheres of 5 to 500 microns in diameter which are protected by an impervious coating. This coating protects against oxidation of the fuel and retains the fission products within the system. Important coating materials are refractory metals, alumina, pyrolytic graphites and other similar materials. The coated microspheres are used to prepare the fuel elements, either by compaction in a tube or by fabrication into a cermet element.

The present methods for the preparation of microspheres are laborious, costly and result in a low yield of microsphere products. From a practical standpoint, they are of limited effectiveness. The product itself which results from the present methods of preparation suffers from lack of sphericity and surface irregularities. It is also well known that the strength characteristics of the microspheres prepared by the present technique leave much to be desired.

The principal difficulties encountered in microsphere preparation by existing methods are technical difficulties that arise from using ceramic powders as the starting material. The ceramic powder must be ground, compacted, sintered to high density, and then crushed to the desired size range. The particles are brought to a general spherical shape by abrasion techniques. The material must be sized and the off-size material recycled at the various stages. The yield in each of the different steps is very low.

We have found that oxide sols, particularly actinide oxide sols, can be used to prepare microspheres to be utilized in nuclear fuel elements as heretofore described. The use of these sols permits relatively simple, direct procedures for the preparation of microspheres. The colloidal constituents contribute to improved properties.

Several novel features essential to a simple direct process result from the use of fluid sols rather than ceramic powder raw materials. Most of these sols are compatible and, on mixing, provide an extremely intimate uniform mixture of the reactive colloidal constituents. Most desired composition ranges are readily obtainable. The fluids can be dispersed to small droplets of controlled size and oxide concentration, factors which provide a product sphere of uniform size. The spherical droplet shape resulting from surface tension effects is retained during drying to the microsphere. The green microspheres sinter readily to high density retaining their uniformity, sphericity, and smooth surfaces. Processes for the preparation of our product microspheres are described herein to demonstrate the product microspheres and their characteristics. Various other drying procedures which maintain droplet dispersion and the essential drying conditions may also be used. These processes and their requirements are described in Ser. No. 329,981, filed Dec. 12, 1963 and now abandoned.

In addition, reaction between colloidal constituents can be effected to obtain dense microspheres of products through chemical reactions. With intimate colloidal constituents, both reaction and densification can occur on suitable heating to form the dense microsphere.

The novel microspheres of our invention can be prepared from various colloidal materials that sinter to suitable ceramics, for example, the colloids of alumina, zirconia, beryllia, actinide oxides, rare earth oxides, etc. Our experience with a wide range of materials indicates that microspheres can be obtained from sols of all stable oxides or their mixtures which are capable of forming stable high temperature dense bodies. The descriptive term "ceramic oxides" has been used for this wide range of oxide materials which includes in addition to the above as examples, silica, magnesia, chromia, Group IV, V, and transition element oxides, and their mixtures. The elements in Group IV which are of interest include titanium, zirconium, hafnium, germanium, tin and lead. The Group V elements include vanadium, columbium, tantalum and palladium. These are essentially the various refractory oxide systems of the ceramic industry.

One specific application of these materials is found in the field of nuclear fuel development. Particular materials suitable for nuclear development include actinide oxides, and mixtures of these oxides. The actinide metals include the elements in the actinide series in the periodic table, i.e., thorium, uranium, neptunium, plutonium, americium, etc.

The elements properly included in the group designated the "rare earths" is the basis of some controversy. We include elements No. 39, yttrium, with the members of the lanthanide series, beginning with element No. 57 through element No. 71 of the periodic table. Thus we include lanthanum, cerium, praesodymium, neodymium, promethium, samarium, europium, gadolinium, terbium, dysprosium, holmium, erbium, thallium, ytterbium, and lutecium, with yttrium in our definition of the rare earth oxides.

The sols used in the preparation of our novel particles are well known. One suitable method of preparing and a description for thoria sols is covered in U.S. Pat. No. 3,097,175. A description of mixed thoria-urania sols and one suitable method of preparing these sols is described in U.S. Pat. No. 3,091,592.

An inherent advantage in the preparation of our spherical particles resides in the fact that the green microspheres consist of dried colloidal residue material. Colloidal particles can range in size from a few to greater than 300 millimicrons. Thoria and urania sol particles, for example, are generally spherical aggregates comprised of even smaller sub-units of 3 to 5 millimicrons in size. The colloidal particles, due to their small size and large surface area, have a strong tendency to coalesce and sinter to dense material at a high temperature. We have found that the aquasols on drying form colloidal residues in which these extremely small particles are closely and uniformly enough packed that sintering to high density or reaction of constituents to dense oxide solid solution phase or product occurs readily and at unusually low temperatures. The dimensions of the internal particulate and void structure of the dried residue of small colloidal particles is 100- to 1,000-fold smaller than that of the compacts prepared from ceramic powders of several microns in size as normally used in sphere preparation or other ceramic procedures. On visual microscopic examination, the colloidal residues appear homogeneous and have a smooth uniform texture. This fine internal microstructure of the dried colloidal residues contributes to the enhanced sinterability and reactivity of the constituents. It also results on sintering in a fine grain structure which improves the physical properties of the ceramic sphere, particularly strength. Thus, the use of colloids or sols is an inherent feature contributing both to obtaining an effective process and improved microsphere properties.

The microsphere particles of our invention are characterized by having certain definite properties. They can range in size from 5 to 10 microns up to above 1,000 microns depending upon the sol droplet size and concentration. They are most readily prepared in the 10 to 500 micron size range.

They generally have an unsintered density from 15 to 45 percent of theoretical with values of 25 to 40 percent of theoretical being more usual. The particles can be made uniform in size, are spherical, and have a smooth surface of uniform texture. They have no tendency to agglomerate, and have a volume fraction of water of less than 60 percent. They are sinterable to a density of greater than 90 percent of theoretical at temperatures of less than one half the melting point for periods of less than 5 hours. For example, this may be accomplished with urania in 4 to 6 hours at temperatures of about 950° to about 1,100°C. The particles retain their physical perfection and uniform surface on sintering to high density. A fine grain structure providing high strength is developed. Generally a sphere of high density approaching theoretical is sought and sintering conditions are directed to this purpose.

The sphericity, uniform surface, and internal structure of the microsphere product of our invention, characteristic of the use of colloidal oxides, is an important novel feature which results in improved product properties. It enables the spheres after coating to retain perfect form under the severe conditions involved in fabrication to solid fuel element bodies.

Techniques based on air permeability are well established in their use to determine particle size. The leading commercial permeability apparatus for this purpose is the commercially available Fisher Sub-Sieve Sizer. The theory and practice of these permeametric measurements is well described in the literature, particularly by E. L. Gooden and C. M. Smith (E. G. Gooden and C. M. Smith, Anal. Chem. 12, 479–82 1940), by C. Orr and J. Dallavalle (Clyde Orr and J. A. Dallavalle, "Fine Particle Measurement, Size, Surface and Pore Volume", MacMillan Co., New York 1959) and the Fisher instrument manual. The instrument is commonly used to measure the size of particles of less than 50 microns. The modifications and calibrations used for larger size ranges is described by B. Dubrow (Bernard Dubrow, Anal. Chem. 25, 1242–4 1953).

This procedure actually measures the particle surface area, but it is common practice to express this value in terms of particle diameter based on the geometric relationship for spheres as below:

$$D = 6\ V/S$$

where
$D$ = diamter
$V$ = volume
$S$ = surface

In developing this method, the term surface-weighted average diameter was used in recognition that the value measured actually is surface area. With the modified Sub-Sieve Sizer equipment, the samples and equipment variables are standardized to permit direct calculation of the surface-weight average diameter, $\bar{D}_s$, from the measured pressures and flows by the following relationship:

$$\bar{D}_s = (KHN/(AH-N))\ 3/2 - F/P - F$$

where
$\bar{D}_s$ = surface-weighted average diamter, microns
$K$ = permeability constant or air resistance tube
$H$ = sample height, cm.
$A$ = cross sectional area, cm$^2$, of sample tube
$P$ = initial gas pressure, g/cm$^2$
$F$ = exit air pressure, g/cm$^2$
$N$ = weight of sample per density Since they are prepared from sols, microspheres within a narrow size range can be obtained in any given run. Thus, microspheres having a size of 200 ± 30 microns are readily prepared. The particles are generally spherical and average diameter, $\bar{D}$, can be calculated with good accuracy. This can be confirmed directly by microscopic examination. For spherical, smooth-surfaced microspheres of uniform microstructure, $\bar{D}$ is dependent upon size and $\bar{D}_s$ as measured from the surface will be similar or very close in value. The irregular surface or internal structure of microspheres prepared from ceramic powders greatly increases the particle surface and results in a much lower measured $\bar{D}_s$ value. A comparison of the $\bar{D}$ and $\bar{D}_s$ value of a sample readily indicates the presence of any undesirable irregular structure. A structural factor, sigma ($\sigma$) as expressed below, has been used to evaluate structural irregularities, to indicate the limits desired and expected for microspheres of colloidal origin, and for their comparison with existing materials.

$$\sigma = \bar{D}/\bar{D}_s$$

Sigma value determined on samples of our microspheres of colloidal material were about 1. The accuracy of these measurements with these materials probably was of the order of ± 10 percent. The shape uniformity is due to the fluid characteristics during drying of the droplet. The surface and internal uniformity is due to the extremely small size of the constituent colloidal particles and their even regular packing. Sigma values of about 1.5 were obtained with samples of urania microspheres as commercially available prepared from ceramic powder. The structural irregularities contributing to this higher value were apparent on microscopic examination.

In summary, our microspheres in the unsintered form have the following characteristics:
a. No tendency to agglomerate,
b. A sigma value derived from the equation sigma = $\overline{D}/\overline{D}_s$ of about 1 to 1.3,
c. A density of 15 to 45 percent of theoretical,
d. Sinterable to a density of greater than 90 percent of theoretical at temperatures as low as 950°C. and times of ½ to 6 hours,
e. A volume fraction of water of less than 60 percent.

In the sintered form they are characterized by:
a. A uniform crystallite structure,
b. A grain size of 1 micron or less,
c. A sigma value derived from the equation sigma = $D/D_s$ of 1 to 1.3.

Our invention is further illustrated by the following specific but non-limiting examples.

EXAMPLE I

A total of 12 liters of solvent (1 part monochlorobenzene and 5 parts, dichlorobenzene) was added to a 22 liter 3 neck flask equipped with stirrer and condenser. This solvent mixture had a density of 1.269 when cold and 1.14 when hot (144°C.). A solvent water separator was attached to the condenser with return of the solvent condensate to the flask. Two concentric tubes passed into the flask and extended about 2 inches below the solvent surface. Water or an aqueous uranium dioxide sol was passed through the inner concentric tube and injected into the solvent from a Number 23 hypodermic needle to form regular small droplets. The cooled solvent condensate was passed through the outer concentric tube to maintain incoming water or sol temperatures. A short Teflon shield (0.5 inch) on the end of the concentric tubes protected the sol droplets from stirring turbulence during formation.

The solvent mixture was heated to 146°C. with stirring, and this temperature maintained throughout the rest of the procedure. Water was passed through the hypodermic needle at 5.3 ml. per minute for 25 minutes until steady distillation conditions had been determined and measured. Distillation was rapid and in balance with the input water, being about 34 to 37 ml. solvent per 5.3 ml. of water per minute. A uranium dioxide aquasol at 1.9 percent $UO_2$ was then substituted for the water at the same rate and dispersed into the boiling solvent mixture by this technique. The sol droplets dispersed into the stirred solvent dried in several seconds and the resulting microspheres settled to collect on the flask bottom. On completing the addition of urania sol, water was again passed into the system for 2 minutes. Heating was stopped and the residual traces of water remaining distilled quickly from the system. The product microspheres were recovered by suction from the collection point at the bottom of the flask, separated from the solvent and dried.

The product consisted of black, small, dense spheres of urania with a smooth lustrous surface. The size ranged from 20 to 120 microns. Screening indicated that the product had been directed largely to a 74 to 105 micron size range. The distribution was as follows: about 10 percent greater than 149 microns, about 15 percent 105 to 149 microns, about 50 percent 74 to 105 microns and about 25 percent below 74 microns.

The preparation of uranium dioxide spheres was further demonstrated in the above equipment with the exception that 24 liters of solvent in a 50 liter flask were used. The solvent was equal parts of tetrachloroethane and dichlorobenzene and had a density of 1.445 when cold and of 1.25 when hot. The water or sol was injected from a Number 23 needle 4 inches below the solvent surface. Distillation conditions were established at 156°C. by injecting 4.6 ml. water per minute which resulted in a solvent recycle of 170 ml. per minute. Urania aquasol (6.3 percent $UO_2$) was then injected into the boiling solvent to form microspheres and the product recovered as described above.

Microscopic examination showed the product to consist of dense, smooth spheres in the range of 30 to 170 microns diameter. Screening showed that the fraction above 105 microns had been increased to above 50 weight percent at the higher sol concentration.

The above procedures demonstrate the preparation of uranium dioxide spheres by dispersion in a stirred immiscible boiling solvent. To obtain densities above 1 most suitable for the droplet dispersion, chlorinated solvents were the main constituents. Spheres have also been prepared by settling through a column of hot immiscible solvent. With the equipment and general procedures of Example II, spheres were readily obtained from $UO_2$ sol on drying in hexanol which had the same perfection in spherical form and surfaces. The dried spheres have ranged from about 30 to 40 percent of theoretical density. On sintering, the spheres densified and shrank without loss of their perfect form. Substantially high density was obtained in hydrogen at 1,000° to 1,100°C. but sintering was usually carried to 1,600°C. to develop optimum strength and crystallite structure. At 1,600°C., polished sections of the spheres had a uniform texture and a grain structure of about 5 microns.

These examples demonstrate the formation of uranium dioxide spheres from $UO_2$ sol by dispersing droplets and drying in an immiscible solvent. The spheres may be sintered to high density retaining their physical form.

EXAMPLE II

This example illustrates the preparation of hydrated uranic oxides spheres and the conversion of these spheres to dense uranium dioxide spheres by dehydrating the colloidal droplets on settling through a counter flowing hot solvent in a column.

Hexanol was heated to 90°C. and pumped into a column of 7 feet in length and 3 inches in diameter. The hexanol entered the column about 4 inches from the bottom and left the column at an overflow about 4 inches from the top. The effluent from the column was dehydrated and recycled for subsequent runs. A 10 percent uranium trioxide ($UO_3$) sol containing colloidal particles of hydrated uranic oxide was injected into the column at a point about 5 inches from the top of the column. The sol was injected at a rate equivalent to 0.2 g. of $UO_3$/minute and formed a stream of uniform yellow droplets which dehydrated on settling through the column to yield yellow microspheres. As the spheres collected in the column cone, they were continuously removed by suction and separated from the solvent stream.

Microscopic examination after drying showed the yellow particles to be spherical, of uniform texture, and to have a smooth surface. The solvent overflow from the top of the column waas passed through a flow meter to a 50 liter stirred pot where the dissolved water was removed by distillation and the distilland continuously recycled to the column bottom. The column was equipped with a conical bottom for the collecting of the settled dried microspheres which were continuously removed by suction through a small tube, separated in a trap, and the solvent returned to the distillation pot.

Prior to injection of the sol into the column, water was injected at the top of the column through a needle device to form droplets of uniform size which dried as they moved down the column. Water injection was continued until the column performance, flow, and the distillation temperature became constant. Sol was then substituted for the water to form the spheres as described above.

Microscopic examination of mounted polished sphere sections showed the spheres to have a translucent yellow appearance and uniform internal structure free from physical cracks or voids that could result in imperfections in the sintered spheres. The dried spheres had a density of 1.7. They were sintered under hydrogen at 1,600°C. for 4 hours. The $UO_2$ spheres recovered from this step had a density of 10.80 (98.5 percent of theoretical). Microscopic and polished section examination showed that the dense black $UO_2$ spheres retained their perfection of form and uniform internal structure.

This example demonstrates the formation of microspheres of colloidal uranic oxide and their direct conversion on sintering to uranium dioxide spheres of excellent physical form. The desirable sintering characteristics of the colloidal materials are particularly indicated by the retention of shape and structrue through densification over the wide range of 1.7 to 10.80 g/cc.

EXAMPLE III

In this example, the equipment and procedures of Example II were used to prepare dried yttria spheres from a ytrria sol. Hexanol was used as the dehydrating agent. The solvent temperature on entering the column was 100.5°C. and the temperature in the distillation pot was maintained at 141°C. Water was added in the form of a spray midway down the column at the rate of 11.4 cc. per minute. A 10 weight percent yttria sol was injected at the top of the column at a rate of 3.5 cc. per minute. The product microspheres were formed as before and after settling through the column were collected and continuously recovered and separated from the solvent stream. The dried spheres had a white, smooth surface of uniform appearance.

This example demonstrates the preparation of dried yttria microspheres from colloidal yttria.

EXAMPLE IV

Zirconia microspheres were prepared using the equipment and procedures described in Example II. Hexanol was used as the dehydrating solvent and a temperature of 103°C. maintained at the column inlet. The distillation pot was operated at 134°C. A water spray was injected in the column as in the previous example at a rate of 14 cubic centimeters per minute. The spheres are prepared by injecting a 15 weight percent zirconia sol at the top of the column at a rate of 2 cc. per minute and the product microspheres were recovered after settling from the bottom of the column. The zirconia particles were a translucent white and had smooth surfaces and a uniform texture. The particles tended to be slightly pear-shaped and close control of operating conditions was required to prevent more extensive particle deformation.

This example demonstrates the preparation of dried zirconia microspheres from zirconia colloids.

EXAMPLE V

Thoria microspheres were obtained with the equipment and general procedures in Example II with the following changes. The column was operated using hexanol as a solvent. The hexanol was heated to a temperature of 92°–93°C. and this temperature maintained at the column inlet. The distillation pot temperature was 106° to 110°C. Operation at this temperature allowed roughly 6 weight percent water in the hexanol solvent. A 10 weight percent $ThO_2$ sol was injected at the top of the column, and the thoria microspheres were recovered from the bottom of the column as before. On examination, these spheres were found to be white, smooth surfaced and of uniform texture and appearance.

This example demonstrates the formation of dried thoria microspheres from thoria colloids.

EXAMPLE VI

In this run the equipment, general procedures and initial solvent mixture of Example I were used to prepare yttria-urania microspheres with the exception that the water or sol was dripped from a Number 20 hypodermic needle into the boiling solvent mixture from a short distance.

Distillation conditions were established at 152°C. using a water flow of 7.4 ml. per minute and obtaining a solvent recycle of 80–90 ml. per minute. Twenty-five ml. of a yttria-urania sol of 3 percent total oxide concentration were then dispersed into the boiling solvent to form microspheres. The oxides in this sol were 55 weight percent yttria. The sol particles were dense spherical aggregates of 20 to 50 millimicron diameter and an intimate mixture of the constituent oxides. On completing sol addition, water was again added to the system at its initial rate for 2 minutes. Heating was stopped and the microsphere product recovered and dried following the procedures described in Example I.

Distillation conditions were established at 152°C. using a water flow of 7.4 ml. per minute and obtaining a solvent recycle of 80–90 ml. per minute. Twenty-five ml. of a yttria-urania sol of 3 percent total oxide concentration were then dispersed into the boiling solvent to form microspheres. The oxides in this sol were 55 weight percent yttria. The sol particles were dense spherical aggreates of 20 to 50 millimicron diameter and an intimate mixture of the constituent oxides. On completing sol addition, water was again added to the system at its initial rate for 2 minutes. Heating was stopped and the microsphere product recovered and dried following the procedures described in Example I.

Microscopic examination showed that the product consisted of dense spheres of uniform smooth surface 40 to 120 microns in diameter. The microspheres were sintered under $H_2$ for 4 hours at 972°C. without change in particle perfection. X-ray examination showed the microspheres had been converted to a yttria-urania solid solution phase and also showed extensive crystallite growth. Colloidal residues of the same yttria-urania sol, sintered under the same mild conditions, have shown in addition to the solid solution formation and crystallite growth, a density approaching the theoretical.

This example demonstrates the preparation of microspheres from an additional combination of colloidal oxides and their conversion to dense spheres of an oxide solid solution phase on reaction of the constituent oxides.

What is claimed is:

1. As compositions of matter dense sintered, microspheres of:
   a. actinide oxides,
   b. mixtures of actinide oxides,
   c. ceramic oxides other than the actinides, and
   d. mixtures of actinide oxides with ceramic oxides, said particles consisting essentially of dried colloidal residues, having a diameter of 5 to 500 microns, a uniform crystallite structure with a grain size of 1 micron or less, and a sigma value derived from the equation Sigma = $D/D_s$ of about 1 to 1.3.

2. The composition of claim 1 having an unsintered density of 15 to 45 percent of theoretical, volume of water content of less than 60 percent in the green particles and being sinterable to a density of greater than 90 percent of theoretical at a temperature of less than one half the melting point for periods of less than 5 hours.

3. The composition of claim 1 wherein the actinide oxides are selected from the group consisting of urania, thoria and plutonia.

4. The composition of claim 1 wherein the ceramic oxides are selected from the group consisting of silica, magnesia, chromia, oxides of iron, cobalt and nickel and oxides of the elements in Groups III, and V in the periodic table.

5. As compositions of matter microspheres of controlled size in the range of 5 to 500 microns, having a green density of 15 to 45 percent theoretical density consisting essentially of dried colloidal residues selected from the group consisting of actinide oxides, and mixtures thereof, actinide oxides with rare earth oxides, being reactive at low temperatures and sintering readily to essentially theoretical density, said mixed particles having the property of forming solid solution phases and dense products by chemical reactions said particles having a sigma value derived from the equation Sigma = $D/D_s$ of about 1.

6. As compositions of matter microspheres according to claim 5 wherein one of the actinide oxides is uranium oxide.

7. As a composition of matter microspheres according to claim 5 wherein one of the actinide oxides is thorium oxide.

8. As a composition of matter microspheres according to claim 5 wherein one of the actinide oxides is plutonium oxide.

9. As a composition of matter microspheres according to claim 5 wherein the actinide oxides are mixtures of thorium and uranium dioxides.

10. As a composition of matter microspheres according to claim 5 wherein the oxides are rare earth oxides.

* * * * *